(12) United States Patent
Spanner

(10) Patent No.: US 6,907,372 B1
(45) Date of Patent: Jun. 14, 2005

(54) DEVICE FOR POSITION INDICATION AND DETECTION OF GUIDANCE ERRORS

(75) Inventor: Erwin Spanner, Traunstein (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 105 days.

(21) Appl. No.: 09/661,663

(22) Filed: Sep. 14, 2000

(30) Foreign Application Priority Data

Sep. 16, 1999 (DE) .......................................... 199 44 395

(51) Int. Cl.$^7$ ........................... G06F 15/00; H03M 1/22
(52) U.S. Cl. .................... 702/104; 702/97; 250/237 G; 356/139.06; 356/617; 341/11
(58) Field of Search .................... 702/104, 97; 341/11, 341/7, 116; 250/237 G, 548; 355/53; 356/401.3, 375, 615, 139.06, 617, 520, 619; 700/195; 33/707

(56) References Cited

U.S. PATENT DOCUMENTS

| 4,101,764 A | 7/1978 | Nelle |
| 4,363,964 A | 12/1982 | Schmitt |
| 4,403,859 A | 9/1983 | Ernst |
| 4,459,750 A | 7/1984 | Affa |

(Continued)

FOREIGN PATENT DOCUMENTS

| DE | 35 42 514 | 6/1987 |
| DE | 42 01 331.3 | 5/1993 |
| DE | 43 01 971 | 8/1993 |
| DE | 91 16 843.0 | 4/1994 |
| DE | 43 03 161 C2 | 8/1994 |
| DE | 43 03 161 | 8/1994 |
| EP | 0 082 441 B1 | 6/1983 |
| EP | 0 082 441 | 6/1983 |
| EP | 0 311 144 | 4/1989 |
| EP | 0 311 279 | 4/1989 |
| EP | 0 387 520 B1 | 9/1990 |
| EP | 0 387 520 | 9/1990 |
| EP | 0 660 085 | 6/1995 |

OTHER PUBLICATIONS

"Wichtige Begriffe der Mikropositionierung," published by Physik Instrumente (PI), while the date of publication is unknown, it is believed that the article was published prior to Sep. 14, 2000, pp. 7.5–7.6.

Pending Patent Application Assigned to Dr. Johannes Heidenhain GmbH: Serial No.: 09/208,127, Filing Date: Dec. 9, 1998, Inventor: Mayer et al.

Pending Patent Application Assigned to Dr. Johannes Heidenhain GmbH: Serial No.: 09/485,358, Filing Date: Apr. 18, 2000, Inventor: Holzapfel et al.

*Primary Examiner*—Kamini Shah
(74) *Attorney, Agent, or Firm*—Brinks Hofer Gilson & Lione (57) ABSTRACT

A device for position indication and the detection of guidance errors that includes a scale that has a position measuring graduation arranged in a position measurement direction. A first guidance error measuring graduation which is arranged perpendicularly with respect to the position measurement graduation and a second guidance error measuring graduation which is arranged perpendicularly with respect to the position measurement graduation, wherein the first guidance error measuring graduation and the second guidance error measuring graduation are arranged on both sides of and adjacent to the position measuring graduation. A position indication scanning unit movable with respect to the scale, wherein the position indication scanning unit scans the position measuring graduation for generating position measurement signals. A guidance error scanning unit that is movable with respect to the scale, wherein the guidance error scanning unit scans the first guidance error measuring graduation for generating guidance error measurement signals.

27 Claims, 3 Drawing Sheets

U.S. PATENT DOCUMENTS

| | | |
|---|---|---|
| 4,462,159 A | 7/1984 | Nelle |
| 4,479,716 A | 10/1984 | Nelle |
| 4,519,140 A | 5/1985 | Schmitt |
| 4,587,622 A | 5/1986 | Herzog |
| 4,654,527 A | 3/1987 | Schmitt |
| 4,758,720 A | 7/1988 | Aubele et al. ............... 356/615 |
| 4,884,280 A | 11/1989 | Kinoshita |
| 4,951,399 A | 8/1990 | Ernst |
| 4,999,623 A | 3/1991 | Affa |
| 5,061,073 A | 10/1991 | Michel ....................... 356/617 |
| 5,079,418 A | 1/1992 | Michel et al. |
| 5,553,390 A | 9/1996 | Ernst et al. |
| 5,651,187 A | 7/1997 | Affa |
| 5,689,336 A | 11/1997 | Huber |
| 5,977,539 A * | 11/1999 | Holzapfel et al. ...... 250/237 G |

* cited by examiner

DEVICE FOR POSITION INDICATION AND DETECTION OF GUIDANCE ERRORS

Applicant claims, under 35 U.S.C. § 119, the benefit of priority of the filing date of Sep. 16, 1999 of a German patent application, copy attached, Serial Number 199 44 395.5, filed on the aforementioned date, the entire contents of which is incorporated herein by reference.

BACKGROUND OF THE INVENTION

1. Field of the Invention

The present invention relates to a device for position indication and the detection of guidance errors, including a scale and a position indication scanning unit as well as a guidance error scanning unit.

2. Discussion of Related Art

Occasionally there is a requirement in connection with modern precision machine tools or coordinate-measuring apparatus to detect, besides the exact indication of the position along a machine axis, possibly existing guidance errors of the respective axis. The detection by measurement techniques of one of the different guidance errors is also called straightness measuring. It is possible to computationally correct the respective measured position value during operation in a suitable evaluation device.

These problems are extensively discussed in EP 0 082 441 A1 and corresponding U.S. Pat. No. 4,587,622, the entire contents of which are incorporated herein by reference. FIGS. 3 and 4 of this document furthermore show a suitable device that makes it possible to determine the respective position along an axis by a high-resolution incremental measurement, as well as to perform the above mentioned detection of guidance errors, or also the straightness measurement. A scale is provided for this that, besides a position measuring graduation in the form of a customary incremental graduation in the measurement direction, also includes a guidance error measuring graduation, which is arranged vertically with respect to it. The guidance error measuring graduation includes graduation marks, which are oriented parallel with the measurement direction and extend over the corner area of a support body of square cross-section. Photoelectrical measuring systems are mentioned for scanning the various measuring graduations which, however, are not further discussed.

A further device for simultaneous position and guidance error measurement is known from EP 0 660 085 A1. Here, a measurement graduation is scanned by a CCD (charge coupled device) line, wherein the measurement graduation contains several tracks. Two tracks with bars, which are oriented parallel with the measurement direction, are arranged symmetrically adjoining a center non-periodic bar code structure. Scanning of the last mentioned tracks, which are oriented vertically with respect to the actual measurement direction, in turn allows the detection of possible guidance errors, or the straightness measurement. However, here the absolute position indication is performed with a relatively rough resolution, therefore this device is not suitable for high-precision applications.

OBJECT AND SUMMARY OF THE INVENTION

It is an object and advantage of the present invention to disclose a device for position indication and the detection of guidance errors which, starting from a customary, high-resolution position measuring device, requires as few modifications as possible in order to also perform a highly precise detection of guidance errors along at least one predetermined axis.

The above object and advantage are attained by a device for position indication and the detection of guidance errors that includes a scale that has a position measuring graduation arranged in a position measurement direction. A first guidance error measuring graduation which is arranged perpendicularly with respect to the position measurement graduation and a second guidance error measuring graduation which is arranged perpendicularly with respect to the position measurement graduation, wherein the first guidance error measuring graduation and the second guidance error measuring graduation are arranged on both sides of and adjacent to the position measuring graduation. A position indication scanning unit movable with respect to the scale, wherein the position indication scanning unit scans the position measuring graduation for generating position measurement signals. A guidance error scanning unit that is movable with respect to the scale, wherein the guidance error scanning unit scans the first guidance error measuring graduation for generating guidance error measurement signals.

In accordance with the present invention, a high-resolution position measuring device, such as is known from EP 0 387 520 B1 and corresponding U.S. Pat. No. 5,079,418, the entire contents of which is incorporated herein by reference, for example, is modified in such a way that a simultaneous detection of guidance errors is possible with it. At least two guidance error measuring graduations, each of which is oriented vertically with respect to the position measuring graduation, are arranged at the sides of the scale of the device of the present invention and adjoining a conventional position measuring graduation in the form of an incremental graduation. Preferably, two identically designed scanning units, which merely need to be arranged turned by 90° with respect to each other, are provided for scanning the different measurement graduations. One of the two scanning units is used as the position indication scanning unit, which in a known manner scans the position measuring graduation in the measurement direction to generate position measurement signals. The second scanning unit, functioning as a graduation error scanning unit, scans the guidance error measuring graduations for generating guidance error measurement signals. Together with the position indication scanning unit, the guidance error scanning unit is movable with respect to the scale along the measurement direction.

Thus, compared with the known position measuring device from EP 0 387 520 B1, only the additional arrangement of the two guidance error measuring graduations on the scale, as well as a second, identical, scanning unit are required, in order to perform the position indication, as well as the detection of guidance errors, with a single device.

The generation of the position measurement signals, as well as the generation of the guidance error measurement signals, is based on an interferential scanning system, i.e. a correspondingly high resolution or precision is assured for each of the two measurements.

Moreover, the arrangement of the position measuring graduation and the two guidance error measuring graduations on the scale is extremely space-saving, i.e. no large structural volumes are required on the part of the scale.

The device in accordance with the present invention can also be modified or enlarged in many ways, for example, by adding further scanning units for detecting other guidance errors, or the employment of alternative scanning principles, etc.

Further advantages, as well as details, of the present invention ensue from the following description of several exemplary embodiments, making reference to the attached drawings.

DETAILED DESCRIPTION OF THE INVENTION

Figure 1:
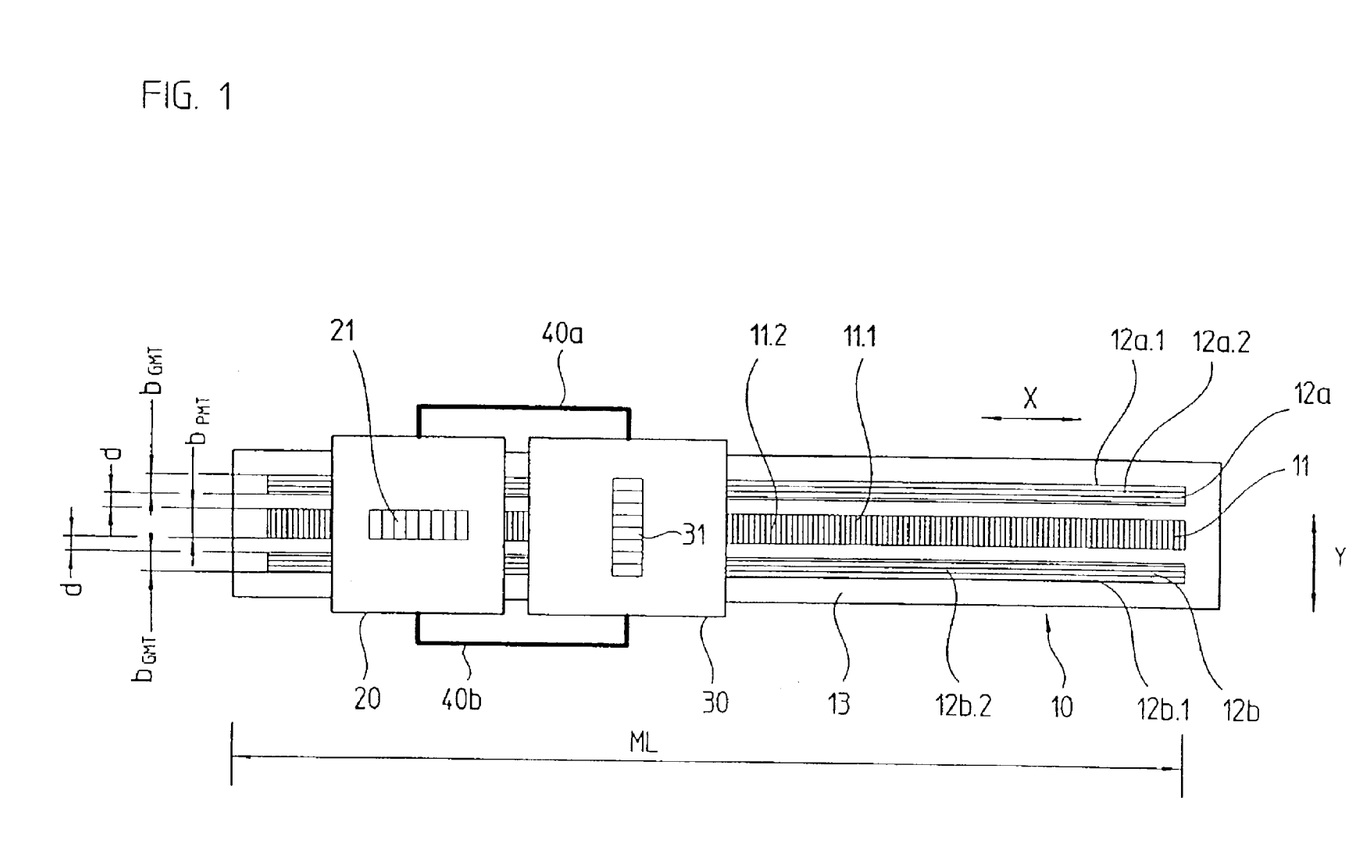
FIG. 1 is a schematic top plan view of a first embodiment of a device for position indication and the detection of guidance errors in accordance with the present invention.

A first exemplary embodiment of the device in accordance with the present invention is schematically represented in a top plan view in FIG. 1. For reasons of clarity, not all elements, in particular on the part of the respective scanning units 20, 30, have been represented.

As can be seen in FIG. 1, the device in accordance with the present invention for position indication and detection of guidance errors includes a scale 10, as well as two scanning units 20, 30, which can be moved with respect to the scale 10 in a measurement direction x. In actual use, the scale 10 is here movably arranged with respect to the two scanning units 20, 30, however, only the possible relative movement between the scale 10 and the scanning units 20, 30 is essential. In what follows, the two scanning units 20, 30 will be called position indication scanning unit 20 and guidance error scanning unit 30, respectively. Both scanning units 20, 30 are movable together with respect to the scale 10, or vice versa, and for this purpose are arranged in a housing, not represented. The common mobility of the two scanning units 20, 30 with respect to the scale 10 can of course also be provided in other ways, for example, by suitable mechanical coupling elements, etc. The forced mutual movement of the two scanning units 20, 30 by the coupling elements 40a, 40b is schematically indicated in FIG. 1.

The scale 10 and the two scanning units 20, 30 are connected with machine components, for example, which are movable in relation to each other in the measurement direction x. By the device in accordance with the present invention, it is intended to determine, besides the high-precision relative position, guidance errors on the part of the machine along the respective measured distance ML. The measured position and guidance error signals generated by the two scanning units 20, 30 in the case of the relative movement with respect to the scale 10 are provided to an evaluation unit, not represented, for further processing. No further details regarding the concrete evaluation and further processing of the generated signals will be addressed here, instead, only reference is made to EP 0 082 441 A1, already mentioned above.

In this embodiment, the scale 10 of the device of the present invention is designed as a reflecting scale, i.e. the various measuring graduations 11, 12a, 12b arranged thereon are each designed as known reflecting measuring graduations in the form of reflecting phase graduations. Such reflecting measuring graduations include partial areas 11.1, 11.2, 12a.1, 12a.2, 12b.1, 12b.2 of different step heights, which are alternatingly arranged in the respective measurement direction x. In the case of the reflecting phase graduations, these are possibly periodically arranged, bar-shaped reflecting partial areas 11.1, 12a.1, 12b.1, or bars of gold arranged on a reflecting surface also made of gold, for example. The partial areas 11.2, 12a.2, 12b.2 arranged between the bars will be called gaps in what follows.

In the exemplary embodiment represented, a position measuring graduation 11, which includes highly-reflecting bars 11.1 and gaps 11.2, arranged periodically in the measurement direction x, is provided on the center of the top of a support element 13 on the scale 10 of the device in accordance with the present invention. The longitudinal direction of the bars 11.1 or gaps 11.2 is here oriented perpendicularly with respect to the measurement direction x, the corresponding direction is defined as the y-direction. The length of the bars 11.1 corresponds to the width $b_{PMT}$ of the track with the position measuring graduation 11. The graduation period of the position measuring graduation 11 is defined as $TP_{PMT}$.

In the embodiment of the device in accordance with the present invention represented, adjoining the position measuring graduation 11 on both sides, two guidance error measuring graduations 12a, 12b are provided on the support element 13 of the scale 10. The guidance error measuring graduations 12a, 12b are here arranged vertically with respect to the position measuring graduation 11. This means that the bars 12a.1, 12a.2, or the bars and the gaps 12a.2, 12b.2 of the two guidance error measuring graduations 12a, 12b extend over the entire measuring distance ML parallel with the measurement direction x. The width of the two tracks with the guidance error measuring graduations 12a, 12b, is selected to be identical and will be identified by $b_{GMT}$ in what follows, each of the distances of the two tracks with the guidance error measuring graduations 12a, 12b from the center track with the position measuring graduation 11 is identified by d. Both guidance error measuring graduations 12a, 12b have the same graduation period $TP_{GMT}$. It is also possible in principle to arrange the two guidance error measuring graduations 12a, 12b directly adjoining the center position measuring graduation 11, i.e. d=0 can be selected.

In a preferred embodiment, the graduation periods $TP_{PMT}$, $TP_{GMT}$ of the different measuring graduations 11, 12a, 12b are all embodied to be the same.

The generation of the scanning signals with the aid of the two scanning units 20, 30 is respectively based on an interferential effect principle, such as has been extensively described in EP 0 387 520 B1 of Applicant, for example. A corresponding measuring system is sold by Applicant under the product identification LIP 382. Therefore, regarding the signal generation, reference is only made here to the above mentioned document.

Only the respective scanning graduations 21, 31 of the various components of the scanning unit 20, 30 have been represented in FIG. 1 for reasons of improved clarity. It can be seen from the represented orientation of the scanning graduations 21, 31 with respect to the various graduations 11, 12a, 12b on the scale 10, that the left scanning unit 20 is used for scanning the position graduation 11. For this purpose, the scanning graduation 21 of the position indication scanning unit 20 is oriented on the scale 10 identically to the position measuring graduation 11. Therefore, in case of a relative movement in the measurement direction x, periodically modulated incremental signals of a signal period $TP_{PMT}/4$ are generated by the position determining scanning unit 20, which can be further processed in a known manner. Thus, the position measurement signals generated in this way are used for the precise indication of the relative position of the scanning unit 20 with respect to the scale 10 in the measurement direction x, and is therefore identical with the known variation from EP 0 387 520 B1.

In case of using the above mentioned LIP 382 system, there is a graduation period $TP_{PMT}=0.512$ μm, and a resulting signal period of the incremental position measurement signals of 0.128 μm.

The guidance error scanning unit 30 is arranged slightly offset in the measurement direction x and vertically to the position indication scanning unit 20. Accordingly, the scanning graduation 31 of this scanning unit 30 is arranged turned by 90°, i.e. in the y-direction, with respect to the scanning unit 21 of the position indication scanning unit 20, i.e. identical with the orientation of the two guidance error measuring graduations 12a, 12b on the scale 10. If now, in case of the movement in the measurement direction x, also a relative movement in the y-direction, i.e. vertically with respect to the measurement direction x, results because of possible guidance errors, this movement is precisely defined with the aid of the guidance error scanning unit 30. In case of the relative movement in the y-direction, the guidance error measurement signals also represent periodically modulated incremental signals which, as a result of the scanning of the two guidance error measuring graduations 12a, 12b, have the signal period $TP_{GMT}/4$. These signals are also further processed in a known manner in the above mentioned evaluation unit. If, as mentioned above, the graduation periods of all involved measuring graduations 11, 12a, 12b are selected to be identical, in case of using the LIP 382 system and where $TP_{GMT}=0.512$ μm, there is a signal period of the incremental graduation error measurement signal of 0.128 μm.

By means of an appropriate dimensioning of the widths $b_{GMT}$, $b_{PMT}$ of the different graduation tracks 11, 12a, 12b, as well as the distances d on the scale 10, it is now possible to assure that two identically designed scanning units 20, 30 based on the known principle from EP 0 387 520 B1, can be used. It is merely necessary to arrange them turned by 90° with respect to each other. Besides this, only the two guidance error measuring graduations 12a, 12b are required on the scale 10. Thus, it is possible without large extra outlay to rearrange the known measuring system from EP 0 387 520 B1 into the device in accordance with the present invention.

Alternatively to the arrangement of two separate guidance error scanning units 20, 30 in accordance with the above explained example, the device in accordance with the present invention can also be altered. For example, it is also possible to integrate the optical function of the two scanning units in a single scanning unit, which is movable with respect to the scale, or vice versa. It would be possible in this case to produce an even more compact system on the scanning side.

Figure 2:
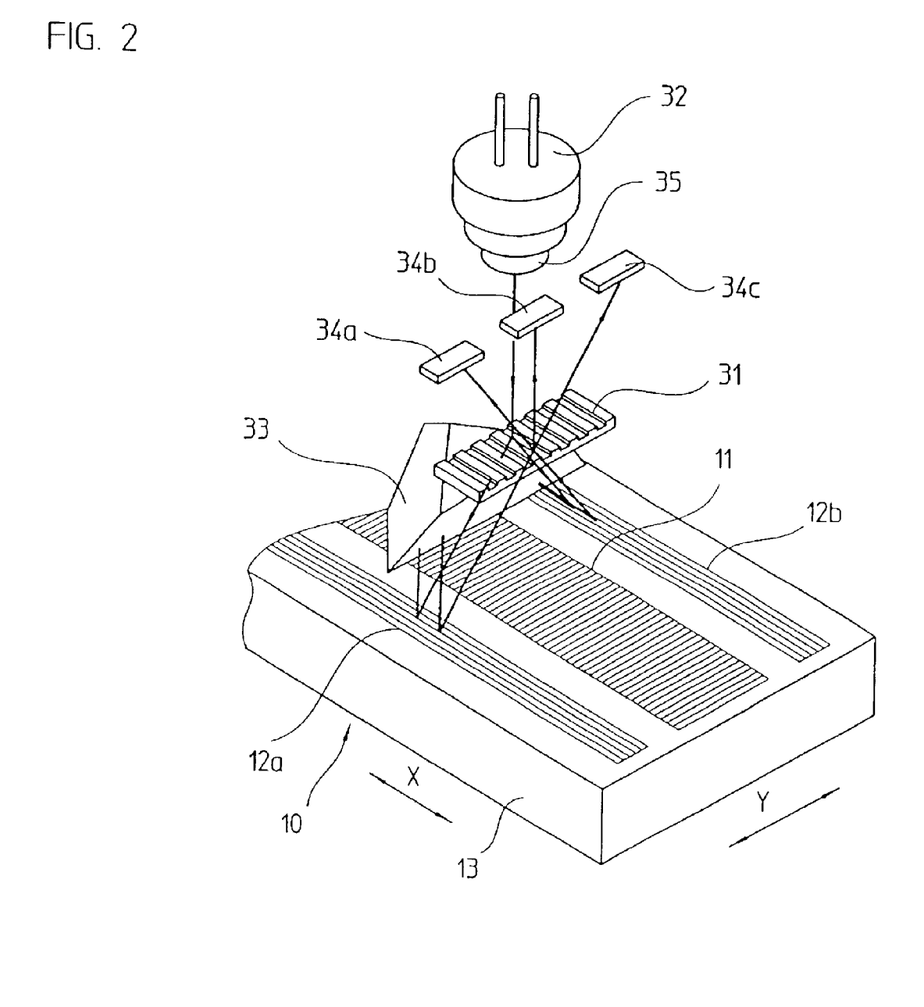
FIG. 2 is a perspective plan view of an embodiment of a scale and of portions of an embodiment of a guidance error scanning device to be used with the device of FIG. 1.

A further schematic partial representation of the device in accordance with the present invention is shown in a perspective plan view in FIG. 2. Only some of the components of the guidance error scanning unit 30 from FIG. 1 are shown here for better representing the spatial orientation of the different components or the scanning beam path during the guidance error measurement. As explained previously, the position indication scanning unit, not represented in FIG. 2, comprises the identical components, however arranged turned by 90° with respect to the components represented in FIG. 2.

Accordingly, the respective scanning units include a light source 32, an optical collimation device 35, a scanning graduation 31, a retro-reflection component 33, as well as several detector elements 34a, 34b, 34c. The beams emitted by the light source 32 are first collimated with the aid of the optical collimation device 35 before they reach the scanning graduation 31, which is designed as a transmission graduation. There, splitting of the incident beams into several partial beams of different orders of diffraction takes place. At least two orders of diffraction, preferably the +/− first orders, thereafter impinge on the guidance error measuring graduations 12a, 12b, are there diffracted again and reflected into the direction of the retro-reflection component 33. Accordingly, in this exemplary embodiment the center distance of the two guidance error measuring graduations 12a, 12b should be selected such, that it corresponds to the distance between the orders of diffraction impinging on the scale. The optical layout of the retro-reflection component 33 assures that the incident partial beams are again reflected in the direction of the two guidance error measuring graduations 12a, 12b. The retro-reflection component 33 is embodied as a triple prism of suitable dimensions, or as an optically corresponding triple mirror arrangement. Reference regarding further details is made in this connection to EP 0 387 520 B1. Following renewed reflection at the two guidance error measuring graduations 12a, 12b, the different partial beams finally again impinge on the scanning unit 31, which in the end deflects the pairs of interfering partial beams into different spatial directions to the total of three detector elements 34a, 34b, 34c. In case of a relative movement in the y-direction of the guidance error scanning unit with respect to the scale 10, periodically modulated incremental signals then finally appear at the output side of the three detector element 34a, 34b, 34c. In this case, there is a phase shift of 120° between the signals at the three detector elements 34a, 34b, 34c.

Figure 3:
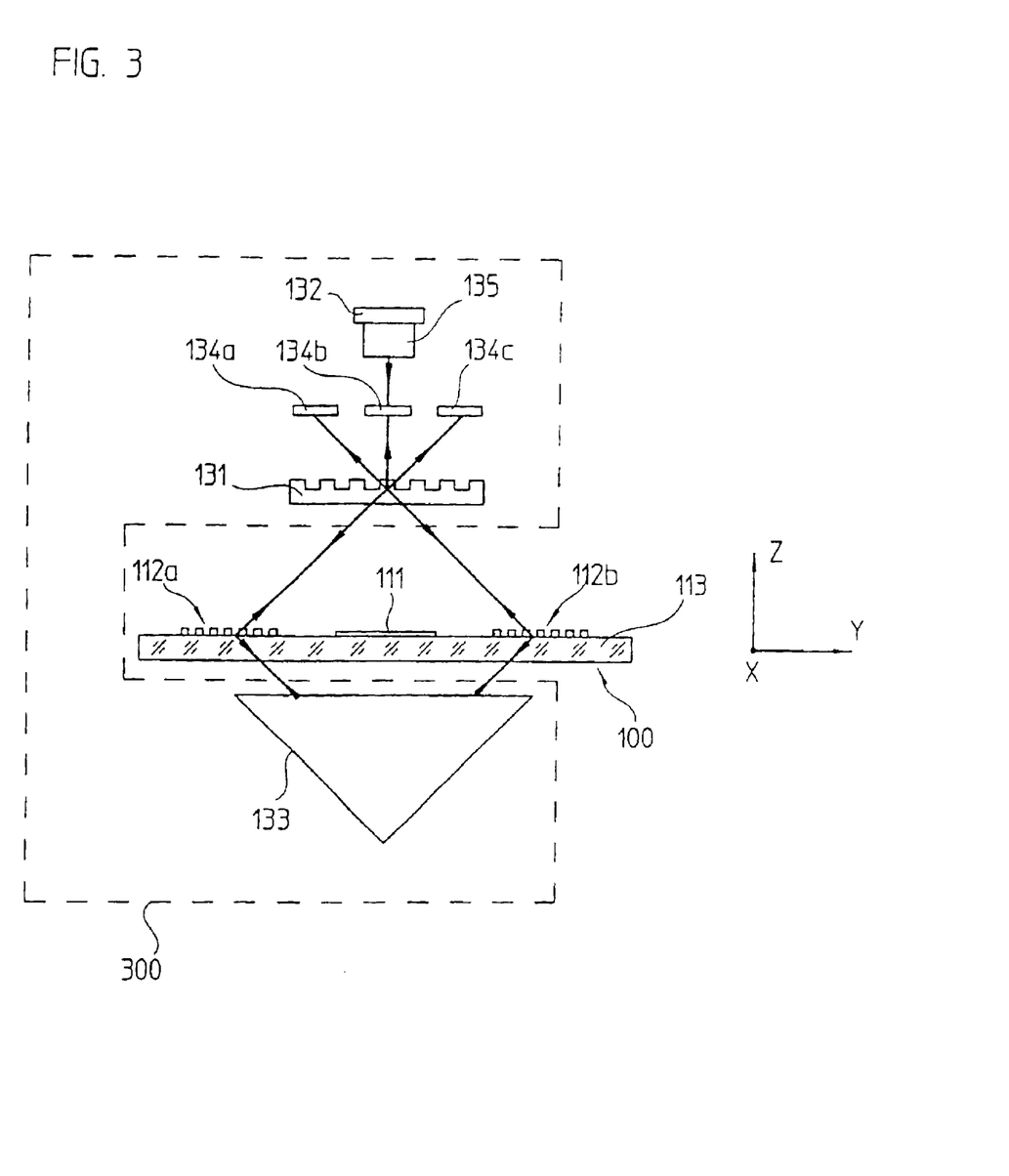
FIG. 3 shows the beam path for guidance error measuring in a second exemplary embodiment of a device for position indication and the detection of guidance errors in accordance with the present invention.

A second exemplary embodiment of the device in accordance with the invention will be explained by means of FIG. 3 in what follows. While the first described exemplary embodiment was laid out as an incident light system, it will be shown by means of FIG. 3, that the device in accordance with the present invention can of course also be designed as a transmitted light system. FIG. 3 here shows a sectional representation of the scale 100 and the guidance error scanning unit 300 in the y-z-plane in order to explain the scanning beam path of the guidance error measurement in particular, or in this case the straightness measurement. The scale 100 and the scanning unit 300 are arranged movable with respect to each other in the measurement direction x. Regarding the not represented arrangement of the position indication scanning unit, reference is made to FIG. 2 in EP 0 387 520 B1, which shows the conditions in the scanning beam path for position measurement in the x-z-plane.

A centrally arranged position measuring graduation 111 and guidance error measuring graduations 112a, 112b arranged on both sides thereof are again provided on the side of the scale 100 on a now transparent support element 113. In the transmitted light system, the respective graduations 111, 112a, 112b are now designed as transmission graduations, preferably phase transmission graduations. As can be seen in the sectional view of the two guidance error measuring graduations, they include periodically arranged bars and gaps in the respective measurement direction, wherein the bars and gaps have different step heights.

As in the previous exemplary embodiment, the guidance error scanning unit includes a light source 132, an optical collimation device 135, a scanning graduation 131, a retro-reflection component 133 embodied as a triple prism, as well as three opto-electronic detector elements 134a, 134b, 134c. The beams emitted by the light source 132 and arranged parallel by the optical collimation device 135 again initially reach the scanning graduation 131, where they are diffracted or split into different partial beams. Thereafter, the diffracted partial beams impinge on the respective guidance error measuring graduations 112a, 112b on the scale 100 and are again diffracted by them in transmission. After back-reflection by the retro-reflection component 133, the partial beams again pass through the two guidance error measuring graduations 112a, 112b, until finally pairs of partial beams capable of interference are present in the plane of the scanning graduation 131. Finally, a deflection of the respective interfering partial beams in the direction toward the detector elements 134a, 134b, 134c takes place with the aid of the scanning graduation 131, where in case of a relative movement between the scale 100 and the guidance error scanning unit 300 in the y-direction phase-shifted incremental signals are present.

Besides this second embodiment of the device in accordance with the present invention further alternatives can of course be produced within the scope of the present invention. It would be possible, for example, to also employ the scanning system known from EP 0 311 144 B1 in connection with the respective scanning units in order to generate the various scanning signals. In this case, too, only a second identical scanning unit would be required, which is arranged turned by 90° with respect to the customary scanning unit and scans the two, also additional, guidance error measuring graduations, which would have to be arranged on the scale adjoining the position measuring graduation.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

For example, other known scanning principles can also be appropriately adapted with a few modifications and used within the scope of the present invention. Moreover, the device in accordance with the present invention can of course also be changed in that further guidance errors can be detected, for example guidance errors based on rotations around defined axes. It is then necessary for this to provide correspondingly additional guidance error scanning units or guidance error measuring graduations, such as was proposed in FIGS. 3 and 5 of the already previously mentioned EP 0 082 441, etc.

I claim:

1. A device for position indication and the detection of guidance errors, comprising:
    a scale comprising:
        a position measuring graduation arranged in a position measurement direction;
        a first guidance error measuring graduation which is arranged perpendicularly with respect to the position measurement graduation;
        a second guidance error measuring graduation which is arranged perpendicularly with respect to the position measurement graduation, wherein the first guidance error measuring graduation and the second guidance error measuring graduation are arranged on both sides of and adjacent to the position measuring graduation, wherein the first guidance error measuring graduation and the second guidance error measuring graduation each has a graduation period identical to the position measuring graduation and extend over an entire measurement distance;
    a position indication scanning unit movable with respect to the scale, wherein the position indication scanning unit scans the position measuring graduation for generating position measurement signals; and
    a guidance error scanning unit that is movable with respect to the scale, wherein the guidance error scanning unit scans the first guidance error measuring graduation for generating guidance error measurement signals.

2. The device in accordance with claim 1, wherein the position measuring graduation and the first guidance error measuring graduation are arranged on the surface of a common support element.

3. The device in accordance with claim 1, wherein the position measuring graduation and the first guidance error measuring graduation are each embodied as reflecting measuring graduations.

4. A device for position indication and the detection of guidance errors, comprising:
    a scale comprising:
        a position measuring graduation arranged in a position measurement direction;
        a first guidance error measuring graduation which is arranged perpendicularly with respect to the position measurement graduation;
        a second guidance error measuring graduation which is arranged perpendicularly with respect to the position measurement graduation, wherein the first guidance error measuring graduation and the second guidance error measuring graduation are arranged on both sides of and adjacent to the position measuring graduation;
    a position indication scanning unit movable with respect to the scale, wherein the position indication scanning unit scans the position measuring graduation for generating position measurement signals, wherein the position indication scanning unit and the first guidance error scanning unit are embodied to be identical and are arranged vertically with respect to each other; and
    a guidance error scanning unit that is movable with respect to the scale, wherein the guidance error scanning unit scans the first guidance error measuring graduation for generating guidance error measurement signals.

5. The device in accordance with claim 1, wherein the position indication scanning unit comprises:
    a light source that emits beams of light;
    a scanning graduation;
    a retro-reflection component; and
    a detector element.

6. The device in accordance with claim 1, wherein the guidance error scanning unit comprises:
    a light source that emits beams of light;
    a scanning graduation;
    a retro-reflection component; and
    a detector element.

7. The device in accordance with claim 5, wherein the guidance error scanning unit comprises:
    a light source that emits beams of light;
    a scanning graduation;
    a retro-reflection component; and
    a detector element.

8. A device for position indication and the detection of guidance errors, comprising:
    a scale comprising:
        a position measuring graduation arranged in a position measurement direction;

a first guidance error measuring graduation which is arranged perpendicularly with respect to the position measurement graduation;

a second guidance error measuring graduation which is arranged perpendicularly with respect to the position measurement graduation, wherein the first guidance error measuring graduation and second guidance error measuring graduation are arranged on both sides of and adjacent to the position measuring graduation;

a position indication scanning unit movable with respect to the scale, wherein the position indication scanning unit scans the position measuring graduation for generating position measurement signals, the position indication scanning unit comprising:
  a light source that emits beams of light;
  a scanning graduation;
  a retro-reflection component; and
  a detector element;

a guidance error scanning unit that is movable with respect to the scale, wherein the guidance error scanning unit scans the first guidance error measuring graduation for generating guidance error measurement signals, and wherein the guidance error scanning unit is arranged with respect to the first guidance error measuring graduation in such a way that the beams of light emitted by the light source first pass through the scanning graduation, thereafter impinge on the first guidance error measuring graduation and are reflected back from there in the direction of the retro-reflection component, which reflects the incident beams of light back in the direction of the first guidance error measuring graduation, from where again a reflection in the direction toward the scanning graduation takes place before the beams of light impinge on the detector element.

9. A device for position indication and the detection of guidance errors, comprising:
  a scale comprising:
    a position measuring graduation arranged in a position measurement direction;
    a first guidance error measuring graduation which is arranged perpendicularly with respect to the position measurement graduation;
    a second guidance error measuring graduation which is arranged perpendicularly with respect to the position measurement graduation, wherein the first guidance error measuring graduation and second guidance error measuring graduation are arranged on both sides of and adjacent to the position measuring graduation;
  a position indication scanning unit movable with respect to the scale, wherein the position indication scanning unit scans the position measuring graduation for generating position measurement signals:
  a guidance error scanning unit comprising:
    a light source that emits beams of light;
    a scanning graduation;
    a retro-reflection component; and
    a detector element, the guidance error scanning unit is movable with respect to the scale, wherein the guidance error scanning unit scans the first guidance error measuring graduation for generating guidance error measurement signals, and wherein the guidance error scanning unit is arranged with respect to the first guidance error measuring graduation in such a way that the beams of light emitted by the light source first pass through the scanning graduation, thereafter impinge on the first guidance error measuring graduation and are reflected back from there in the direction of the retro-reflection component, which reflects the incident beams of light back in the direction of the first guidance error measuring graduation, from where again a reflection in the direction toward the scanning graduation takes place before the beams of light impinge on the detector element.

10. The device in accordance with claim 7, wherein the guidance error scanning unit is arranged with respect to the first guidance error measuring graduation in such a way that the beams of light emitted by the light source first pass through the scanning graduation, thereafter impinge on the first guidance error measuring graduation and are reflected back from there in the direction of the retro-reflection component, which reflects the incident beams of light back in the direction of the first guidance error measuring graduation, from where again a reflection in the direction toward the scanning graduation takes place before the beams of light impinge on the detector element.

11. The device in accordance with claim 8, wherein the respective widths of the first and second guidance error measuring graduations and of the position measuring graduation are dimensioned perpendicularly with respect to the position measurement direction, so that an identically embodied position indication scanning unit and guidance error scanning unit can be used.

12. The device in accordance with claim 9, wherein the respective widths of the first and second guidance error measuring graduations and of the position measuring graduation are dimensioned perpendicularly with respect to the position measurement direction, so that an identically embodied position indication scanning unit and guidance error scanning unit can be used.

13. The device in accordance with claim 10, wherein the respective widths of the first and second guidance error measuring graduations and of the position measuring graduation are dimensioned perpendicularly with respect to the position measurement direction, so that an identically embodied position indication scanning unit and guidance error scanning unit can be used.

14. The device in accordance with claim 8, wherein the position indication scanning unit and the guidance error scanning unit are arranged in a common housing, which is arranged, movable with respect to the scale, in the position measurement direction.

15. The device in accordance with claim 9, wherein the position indication scanning unit and the guidance error scanning unit are arranged in a common housing, which is arranged, movable with respect to the scale, in the position measurement direction.

16. The device in accordance with claim 10, wherein the position indication scanning unit and the guidance error scanning unit are arranged in a common housing, which is arranged, movable with respect to the scale, in the position measurement direction.

17. The device in accordance with claim 1, wherein the position indication scanning unit and the first guidance error scanning unit are embodied to be identical and are arranged vertically with respect to each other.

18. The device in accordance with claim 4, wherein the first guidance error measuring graduation has a graduation period identical to the position measuring graduation and extend over an entire measurement distance.

19. The device in accordance with claim 4, wherein the first guidance error measuring graduation and the second guidance error measuring graduation each has a graduation period identical to the position measuring graduation and extend over an entire measurement distance.

20. The device in accordance with claim 4, wherein the position measuring graduation and the first guidance error measuring graduation are arranged on the surface of a common support element.

21. The device in accordance with claim 4, wherein the position measuring graduation and the first guidance error measuring graduation are each embodied as reflecting measuring graduations.

22. The device in accordance with claim 4, wherein the position indication scanning unit comprises:
   a light source that emits beams of light;
   a scanning graduation;
   a retro-reflection component; and
   a detector element.

23. The device in accordance with claim 4, wherein the guidance error scanning unit comprises:
   a light source that emits beams of light;
   a scanning graduation;
   a retro-reflection component; and
   a detector element.

24. The device in accordance with claim 22, wherein the guidance error scanning unit comprises:
   a light source that emits beams of light;
   a scanning graduation;
   a retro-reflection component; and
   a detector element.

25. The device in accordance with claim 24, wherein the guidance error scanning unit is arranged with respect to the first guidance error measuring graduation in such a way that the beams of light emitted by the light source first pass through the scanning graduation, thereafter impinge on the first guidance error measuring graduation and are reflected back from there in the direction of the retro-reflection component, which reflects the incident beams of light back in the direction of the first guidance error measuring graduation, from where again a reflection in the direction toward the scanning graduation takes place before the beams of light impinge on the detector element.

26. The device in accordance with claim 25, wherein the respective widths of the first and second guidance error measuring graduations and of the position measuring graduation are dimensioned perpendicularly with respect to the position measurement direction, so that an identically embodied position indication scanning unit and guidance error scanning unit can be used.

27. The device in accordance with claim 25, wherein the position indication scanning unit and the guidance error scanning unit are arranged in a common housing, which is arranged, movable with respect to the scale, in the position measurement direction.

\* \* \* \* \*